United States Patent [19]  [11] 4,146,573
Kane  [45] Mar. 27, 1979

[54] RED MUD TREATMENT

[75] Inventor: James Kane, Olympia Fields, Ill.

[73] Assignee: Nalco Chemical Company, Oak Brook, Ill.

[21] Appl. No.: 930,251

[22] Filed: Aug. 2, 1978

Related U.S. Application Data

[60] Continuation-in-part of Ser. No. 885,138, Mar. 10, 1978, abandoned, which is a division of Ser. No. 808,770, Jun. 22, 1977, abandoned.

[51] Int. Cl.² ............................................. C01G 23/00
[52] U.S. Cl. ...................................... 423/82; 423/119; 423/120; 423/121
[58] Field of Search .................. 423/119, 120, 121, 82

[56] References Cited

U.S. PATENT DOCUMENTS 3,023,162  2/1962  Fordyce et al. ...................... 423/119

Primary Examiner—James Poer
Attorney, Agent, or Firm—John G. Premo; Robert A. Miller

[57] ABSTRACT

Red mud slurries can be solidified by adding thereto certain fatty substituted quaternary ammonium salts.

3 Claims, No Drawings

RED MUD TREATMENT

INTRODUCTION

The almost universally used process for the manufacture of alumina is the Bayer process. In its broadest aspects, this method is carried out almost exclusively in aqueous solution, and is achieved by reaction of bauxite and a strong base such as caustic soda or lime in steam-heated autoclaves whereby the alumina is transformed into a soluble aluminate form. In this step, a considerable amount of insoluble impurities result or are released from the bauxite which must be separated from the desired alumina constituent. These residues, commonly known as red muds, include iron oxides, sodium alumino-silicate, titanium oxide and other materials. Generally, these muds appear as very fine particles which are difficult to separate out. Yet the red muds which usually constitute about 10-55% by weight of the ore must be rapidly and cleanly separated from the solubilized alumina liquor. It is important that the excess caustic also be recovered and reused in subsequent runs.

The separation of red mud from alumina and caustic solution is generally effected by first treating the red mud suspension or slurry with chemicals to promote flocculation of solids contained therein. The initial separation in the primary settlers is followed by a wash step. Specifically, the primary settler solid, normally a 15-30% solid slurry, is washed with on-coming liquor frm the washing cycle, i.e. Counter Current Displacement Wash Circuit or sand filter, whichever is being utilized. The resultant underflow generally having from 15-40% solids is subsequently washed a plurality of times. The wash waters containing suspended red mud, dissolved alumina and caustic are then also treated with chemicals to promote settling.

When all of the red mud has been removed from the alumina in the final processing stages, it is concentrated and becomes a sticky, plastic mass which must be transported and acted upon by chemical processing equipment such as conveyors, mixers, raking devices and the like. The concentration of red mud contained in the solid-likesuspensions can range between 5-65% by weight. The handling of such unworkable masses has also been a problem to the aluminum manufacturing industry, and it has recently been proposed to fluidize these materials by the addition thereto of a relatively low molecular weight acrylate polymer. The fluidization of red mud suspensions of this type is more fully described in copending applications Ser. No. 911,027 filed June 5, 1978, which is a continuation-in-part of Ser. No. 882,680 filed Mar. 2, 1978, now abandoned, which is a continuation-in-part of Ser. No. 808,770 filed June 22, 1977, now abandoned.

After these muds have been fluidized according to the above reference or other means utilizing anionically charged materials, it would be desirous if after transport, slurries of this type could be reconverted from a state of plasticity to that of a solid. Solids made from red muds of this type could be used as fillers for construction maerial, fillers for plastics and other numerous uses.

THE INVENTION

In accordance with this invention, it is possible to convert red mud suspensions which have been fluidized using anionically charged materials and convert them into hardened masses using certain cationically charged materials.

While it is not definitely known how this invention functions, it is believed that the cationic quaternary ammonium salts of this invention neutralize the anionic charge of the fluidizing agent in the red mud, negating the effect of the anionic causing the red mud suspensions to solidify.

In certain cases, it is desirable to take aqueous suspensions of red mud which are plastic-like masses and convert them into hardened masses which would make them susceptible to being used as fillers for cement, land fill materials and the like.

I have found that these plasticized red mud masses, or even red mud that has been rendered fluid by treatment with the acrylic acid polymers may be converted into solid masses by treating these red mud suspensions with from 0.03-0.4 pounds per metric ton of red mud solids, and preferably from 0.045 up to 0.4 pounds per ton of red mud solids in the suspension of a quaternary ammonium salt which contains at least 1 aliphatic group of at least 8 carbon atoms. When utilizing a quaternary ammonium salt of the above description which has been dispersed or dissolved in a solvent, the given range above will out of necessity change if the product is added on a "product" basis. As an example, when a 17.2% solution of a material falling within the description of my invention is utilized, the approximate dosage range on a product level will be from 0.2-2.0 pounds as product per metric ton of red mud solids, and preferably from 0.7 up to 2 pounds per metric ton of red mud solids.

As seen, dosages of the material of this invention are given on the basis of pounds per metric ton of red mud solids. Red mud solids as used herein defines the amount of dry red mud one would obtain if the water contained in the red mud slurry was removed.

Thus, the basic steps of this invention are as follows:
(A) adding to the suspension of red mud with mixing from 0.045-0.40 pounds per metric ton of red mud solids of a quaternary ammonium salt containing at least 1 aliphatic group of at least 8 carbon atoms;
(B) continuing mixing until the red mud has set up to a rigid mass; and then,
(C) recovering a solidified concentrated red mud.

Preferrred quaternary ammonium salts have the structural formulas shown as formulas I and II:

Formula I

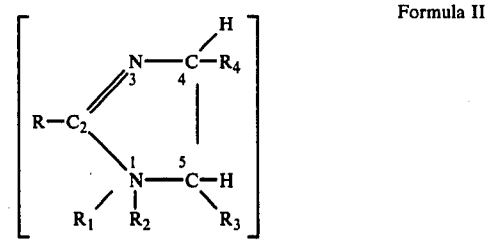

Formula II

In Formula I, R is a higher aliphatic group of frm 8-36 carbon atoms in chain length, e.g. hexadecyl, heptadecenyl, octadecyl and octadecenyl, and $R_1$, $R_2$ and $R_3$ are lower aliphatic carbon groups of from 1–6 carbon atoms in chain length.

In Formula II, R, $R_1$, $R_2$, $R_3$ and $R_4$ are organic groups of the same or different kinds and X is an anion and at least one of the radicals, R, $R_1$ and $R_2$, is an aliphatic group containing 8–36 carbon atoms in an acrylic carbon chain (e.g. octyl, nonyl, decyl, undecyl, dodecyl, undecenyl, tridecyl, tetradecyl, pentadecyl, hexadecyl, oleyl, octadecyl, erucyl, melissyl, hydroxy dodecyl, hydroxy stearyl, ricinoleyl and polymeric radicals derived by the polymerization of materials containing olefinic double bounds such as dimer acids. One of the radicals $R_1$ and $R_2$ is preferably an alkyl group (e.g. methyl, ethyl, propyl, butyl or higher homologues) or an alicyclic group in which the aliphatic portion of the radical is an acyclic hydrocarbon group (e.g. benzyl, cinnamyl and homologues thereof), the other of said radicals being a lower aliphatic radical containing not more than 6 carbon atoms (e.g. methyl, ethyl, propyl, butyl, isopropyl, isobutyl, amyl, isoamyl, hexyl, hydroxy ethyl, hydroxy propyl, hydroxy butyl, $-C_2H_4NH_2$, $-C_2H_4NHC_2H_4NH_2$, $-C_2H_4NHC_2H_4NHC_2H_4NH_2$, $-C_3H_6NH_2$, $-C_3H_6NHC_3H_6NH_2$, and homologues thereof). The radicals $R_3$ and $R_4$ are preferably hydrogen or lower alkyl radicals containing not more than 6 carbon atoms (e.g. methyl, ethyl, propyl, isopropyl, butyl, isobutyl, amyl, isoamyl and hexyl).

In Formulas I and II, X is an anion from the group consisting of sulfate, chloride and bromide. X may also represent other inorganic negatively charged radicals. In the preferred embodiment of this invention, X is chloride or sulfate.

For purposes of illustrating quaternary ammonium salts of the type shown in Formulas I and II, Table I is presented below:

TABLE I
QUATERNARY AMMONIUM SALTS

A. Imidazolinium salts:
(1) 2-methyl-1-(2-hydroxyethyl)-1-benzyl imidazolinium chloride;
(2) 2-coco-1-(2-hydroxyethyl)-1-benzyl imidazolinium chloride;
(3) 2-coco-1-(hydroxyethyl)-1-(4-chlorobutyl) imidazolinium chloride;
(4) 2-coco-1-(2-hydroxyethyl)-1-octadecenyl imidazolinium chloride;
(5) 2-tall oil fatty-1-(2-hydroxyethyl)-1-benzyl imidazolinium chloride*;
(6) 2-tall oil fatty-1-(2-hydroxyethyl)-1-(4-chlorobutyl) imidazolinium chloride;
(7) 2-heptadecenyl-1-(2-hydroxyethyl)-1-(4-chlorobutyl) imidazolinium chloride;
(8) 2-heptadecenyl-1-(2-hydroxyethyl)-1-benzyl imidazolinium chloride;
(9) 2-heptadecyl-1-(hydroxyethyl)-1-octadecyl imidazolinium chloride;

B. Aliphatic quaternaries:
(10) Dodecyl trimethyl ammonium chloride;
(11) Hexadecyl trimethyl ammonium chloride;
(12) Octadecyl trimethyl ammonium chloride;
(13) Coco trimethyl ammonium chloride;
(14) Soya trimethyl ammonium chloride;
(15) Tallow trimethyl ammonium chloride;
(16) Dicoco dimethyl ammonium chloride;
(17) Coco amine Rx 15 moles EtO quaternized with methyl chloride;
(18) Octadecyl amine Rx 2 moles EtO quaternized with methyl chloride;
(19) Octadecenyl amine Rx 2 moles EtO quaternized with methyl chloride;
(19A) Di(hydrogenated tallow) dimethyl ammonium chloride;

C. Miscellaneous quaternary ammonium compounds:
(20) Lauryl isoquinolinium bromide;
(21) Cetyl isoquinolinium bromide;
(22) Lauryl isoquinolinium chloride;
(23) Alkyl ($C_8H_{17}$ to $C_{18}H_{37}$ dimethyl-3,4-dichlorobenzyl ammonium chloride and alkenyl ($C_{16}$ to $C_{20}$) dimethyl ethyl ammonium bromides in the ratio of 5:1;
(24) Octadecenyl-9-dimethyl benzyl ammonium chloride;
(25) 1-dodecyl-2-benzyl pyridinium bromide;
(26) 1-methyl-2-ethyl piperidinium bromide;
(27) Hexadecyl pyridinium bromide;
(28) N-soya-N ethyl morpholinium ethosulfate.

*Essentially free from rosin acid components

The imidazolinium salts are preferred.

EXAMPLE 1

The imidazolinium salt used in this evaluation was an 82.8% isopropanol solution of 1-(2-hydroxyethyl)-1-benzyl-2-coco imidazolinium chloride. This solution is referred to hereinafter as Quaternary A.

500 cc of a fluidized red mud containing approximately 595 grams per liter of solids was placed in an 800 cc beaker. This particular sample of red mud had been fluidized by adding thereto a small quantity of a copolymer of acrylic acid, the methyl methacrylate containing approximately 85% acrylic acid. The sample contained in the beaker was then subjected to agitation and 8.75 cc of a 1.0% aqueous solution of Quaternary A was added dropwise into the agitator vortex. After 50% of the Quaternary A solution was added, the vortex disappeared, thus indicating resolidification of the mud. After all of the 8.75 cc was added, the slurry had set up to a rigid mass.

Having thus described my invention, it is claimed as follows:

1. A method of solidifying concentrated aqueous slurries of red mud which comprises:
   (A) adding to the suspension of red mud with mixing from 0.045–0.40 pounds per metric ton of red mud solids of a quaternary ammonium salt containing at least 1 aliphatic group of at least 8 carbon atoms;
   (B) continuing mixing until the red mud has set up to a rigid mass; and then,
   (C) recovering a solidified concentrated red mud.

2. The method of claim 1 wherein the quaternary ammonium salt is selected from the group consisting of:

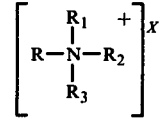

where R is a higher aliphatic group of from 8–36 carbon atoms in chain length and $R_1$, $R_2$ and $R_3$ are lower aliphatic carbon groups of from 1–6 carbon atoms in chain length; and

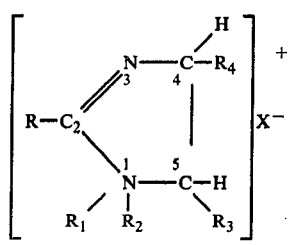
in which R, $R_1$, $R_2$, $R_3$ and $R_4$ are organic groups of the same or different kinds, X is an anion, and at least one of the radicals, R, $R_1$ and $R_2$ is an aliphatic group containing 8-36 carbon atoms in an acrylic carbon chain.
3. The method of claim 2 wherein the imidazolinium salt is 1-(2-hydroxyethyl)-1-benzyl-b 2-coco imidazolinium chloride.
* * * * *

UNITED STATES PATENT AND TRADEMARK OFFICE
CERTIFICATE OF CORRECTION

PATENT NO. : 4,146,573
DATED : MARCH 27, 1979
INVENTOR(S) : JAMES KANE

It is certified that error appears in the above-identified patent and that said Letters Patent are hereby corrected as shown below:

CLAIM:3  The method of claim 2 wherein the imidazolinium salt is 1-(2-hydroxyethyl)-1-benzyl-b  2-coco imidazolinium chloride.

"Letters Patent should read as;"

CLAIM:3  The method of claim 2 wherein the imidazolinium salt is 1-(2-hydroxyethyl)-1-benzyl-2-coco imidazolinium chloride.

Signed and Sealed this

Third Day of July 1979

[SEAL]

Attest:

LUTRELLE F. PARKER
*Attesting Officer*  *Acting Commissioner of Patents and Trademarks*